United States Patent
Wredenhagen

(10) Patent No.: US 8,086,043 B2
(45) Date of Patent: Dec. 27, 2011

(54) SYSTEM AND METHOD OF IMAGE CORRELATION BASED ON IMAGE STRUCTURE

(75) Inventor: Gordon F. Wredenhagen, Toronto (CA)

(73) Assignee: ATI Technologies ULC, Markham, Ontario (CA)

( * ) Notice: Subject to any disclaimer, the term of this patent is extended or adjusted under 35 U.S.C. 154(b) by 1006 days.

(21) Appl. No.: 11/962,394

(22) Filed: Dec. 21, 2007

(65) Prior Publication Data

US 2009/0161988 A1 Jun. 25, 2009

(51) Int. Cl.
*G06K 9/68* (2006.01)
*G06K 9/62* (2006.01)

(52) U.S. Cl. ......... 382/219; 382/209; 382/218; 382/220

(58) Field of Classification Search .................. None
See application file for complete search history.

(56) References Cited

U.S. PATENT DOCUMENTS

| | | | |
|---|---|---|---|
| 7,130,468 B1 * | 10/2006 | Meyer et al. | 382/219 |
| 7,197,074 B2 * | 3/2007 | Biswas et al. | 375/240.16 |
| 7,627,178 B2 * | 12/2009 | Suzuki et al. | 382/190 |
| 7,751,482 B1 * | 7/2010 | Srinivasan et al. | 375/240.16 |
| 2002/0044691 A1 * | 4/2002 | Matsugu | 382/218 |
| 2005/0074160 A1 * | 4/2005 | Miyashita | 382/151 |
| 2005/0276504 A1 * | 12/2005 | Chui et al. | 382/264 |
| 2009/0180672 A1 * | 7/2009 | Ishiyama | 382/118 |
| 2009/0297038 A1 * | 12/2009 | Ishikawa et al. | 382/209 |

OTHER PUBLICATIONS

Choi et al. "New Frame Rate Up-Conversion Using Bi-directional Motion estimation", Aug. 2000, IEEE Transactions on Consumer Electronics, vol. 46, No. 3.*
Bakker et al., "Edge Preserving Orientation Adaptive Filtering", IEEE Computer Society Conference on Computer, Vision and Pattern Recognition, vol. 1, pp. 535-540,(Jun. 23-25, 1999).
Haglund et al., "Scale and Orientation Adaptive Filtering", Department of Electrical Engineering, Computer Vision Laboratory, (Jul. 6, 1993).
Knutsson, "Representing Local Structure Using Tensors", Linköping University, Computer Vision Laboratory, (Jun. 1989).
Van De Weijer et al., "Curvature Estimation in Oriented Patterns Using Curvilinear Models Applied to Gradient Vector Fields", IEEE Transactions on Pattern Analysis and Machine Intelligence, vol. 23, No. 9, pp. 1035-1042, (Sep. 2001).
Van Ginkel et al., "Improved Orientation Selectivity for Orientation Estimation", Processing of $10^{th}$ Scandinavian Conference on Image Analysis (SCIA'97), pp. 533-537, (Lappeenranta, Finland, Jun. 9-11, 1997).
Van Vliet et al., "Estimators for Orientation and Anisotropy in Digitized Images", Proceedings of the First Conference on the Advanced School for Computing and Imaging (ASCI'95), pp. 442-450, (Heijen, The Netherlands, May 16-18, 1995).

* cited by examiner

*Primary Examiner* — Randolph I Chu
(74) *Attorney, Agent, or Firm* — Volpe and Koenig, P.C.

(57) ABSTRACT

A method and apparatus that augments the traditional Phase Plane Correlation (PPC) approach incorporates image structure into the correlation process. In so doing, the energy in spurious peaks that can occur in the phase plane correlation surface are dramatically reduced.

14 Claims, 9 Drawing Sheets

IMAGE 1

IMAGE 2

SYSTEM AND METHOD OF IMAGE CORRELATION BASED ON IMAGE STRUCTURE

FIELD OF INVENTION

The present invention is related to image processing.

BACKGROUND

Phase plane correlation (PPC) is an efficient technique for correlating two images, resulting in a correlation surface in which the peaks and their respective amplitudes are a direct indication of the similarity in image luminance between the two images. In the PPC technique, a normalization step attenuates dissimilarities in luminance that results in a normalized correlation surface that is far more discerning than simple correlation.

There are historical reasons for performing a luminance only analysis, such as PPC. PPC originated out of a need to perform image registration for mapping purposes. The PPC technique is an ideal tool for computing, in a very efficient manner, the translational displacement between two images when it was assumed that the images differed only by translation and variations in luminance. However, when complex motions become part of the image scene, the interpretation of the PPC surface becomes much more complicated.

The traditional PPC technique only takes into account the luminance of the images. As a consequence of this, if two portions of an image are similar in luminance, then their respective correlation will be strong; even if the pixels are part of different structures in the image. This is a fundamental limitation to applying a PPC technique strictly to luminance.

Therefore, there exists a need for an improved method and apparatus for image processing and correlation that takes into account image structure.

SUMMARY

A method and apparatus that augments the traditional Phase Plane Correlation (PPC) technique incorporates image structure into the correlation process. In so doing, the energy in spurious peaks that can occur in the phase plane correlation surface are dramatically reduced.

BRIEF DESCRIPTION OF THE DRAWING(S)

DETAILED DESCRIPTION

Although the features and elements are described in particular combinations, each feature or element can be used alone (without the other feature or elements) or in various combinations with or without other features and elements.

Figure 1:
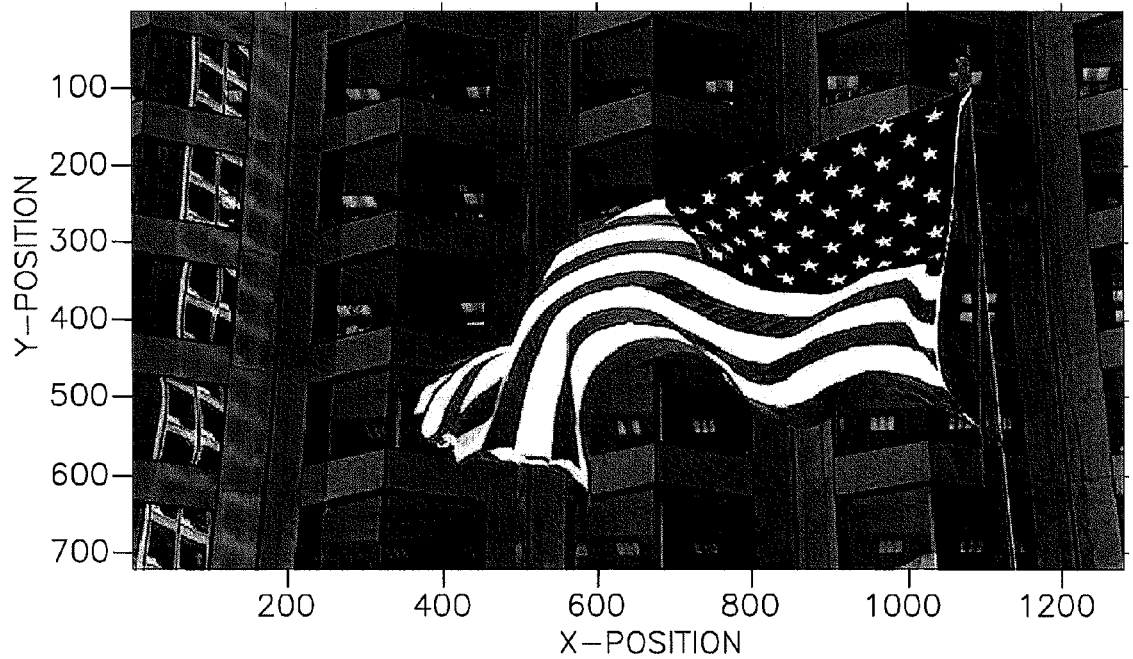
FIG. 1 is an image of the US Flag.

FIG. 1 is an image of the United States flag. As shown in this image, there are many structures that are disparate but which are defined by near equivalent luminance. The stars and the stripes are examples of different structures with equivalent luminance.

Figure 2:
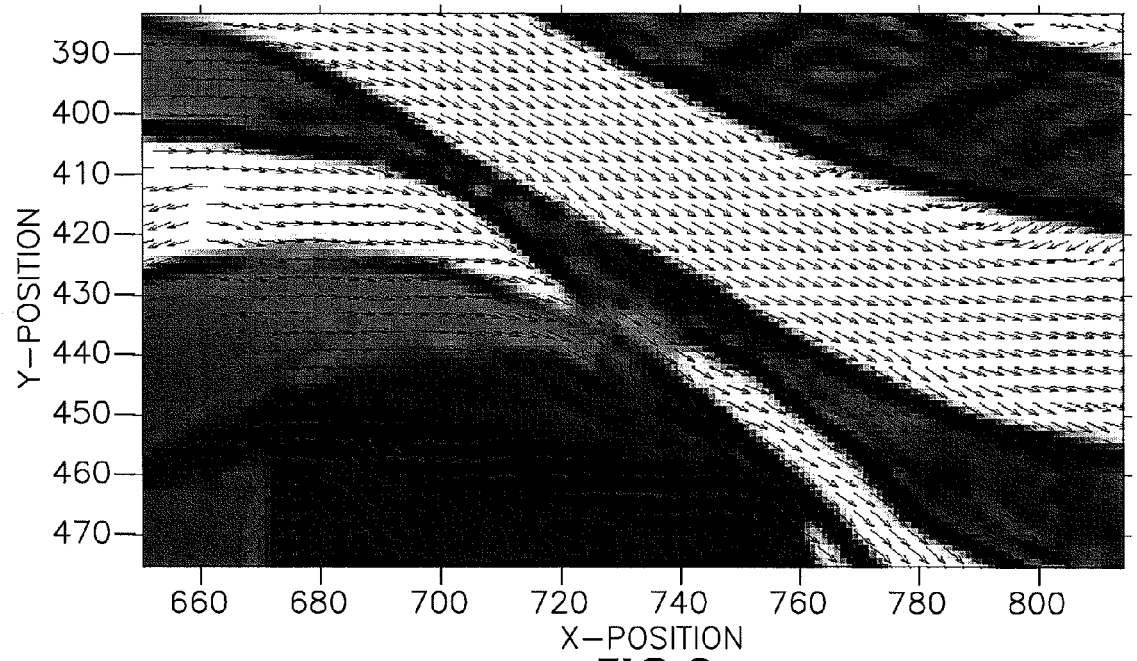
FIG. 2 is a texture decomposition using anisotropic diffusion for a portion of the US flag.

FIG. 2 is a texture decomposition of a portion of the image of the United States flag shown in FIG. 1. An anisotropic diffusion-based method was used to generate a (u, v) gradient vector field based on image content. As indicated hereinbefore, a Phase Plane Correlation (PPC) surface based solely on luminance would result in different structures in this image with the same luminance interacting strongly with other parts.

If the stars and stripes are considered, the PPC peak energy associated with any inter-image shift that has the stars overlap with the stripes will benefit from this luminance similarity and cause any peaks associated with the stars and stripes that match to grow in amplitude. This results in unwanted peak energy that is associated with a spurious peak. As those having skill in the art know, spurious peaks are peaks that owe part of their existence to portions of the image whose luminance happens to match closely, but represents otherwise completely unrelated portions of the image. In fact, they generally represent different structures in the image and their contribution to any correlation surface should be attenuated.

As such, a method and apparatus are disclosed that matches both luminance and image structure, and combines them into one surface so that the peaks result in fewer pre-assignment motion vector candidates. This method allows the correlation surface to be more discriminating and therefore, results in a more accurate computation of translational displacement between two images.

Figure 3:
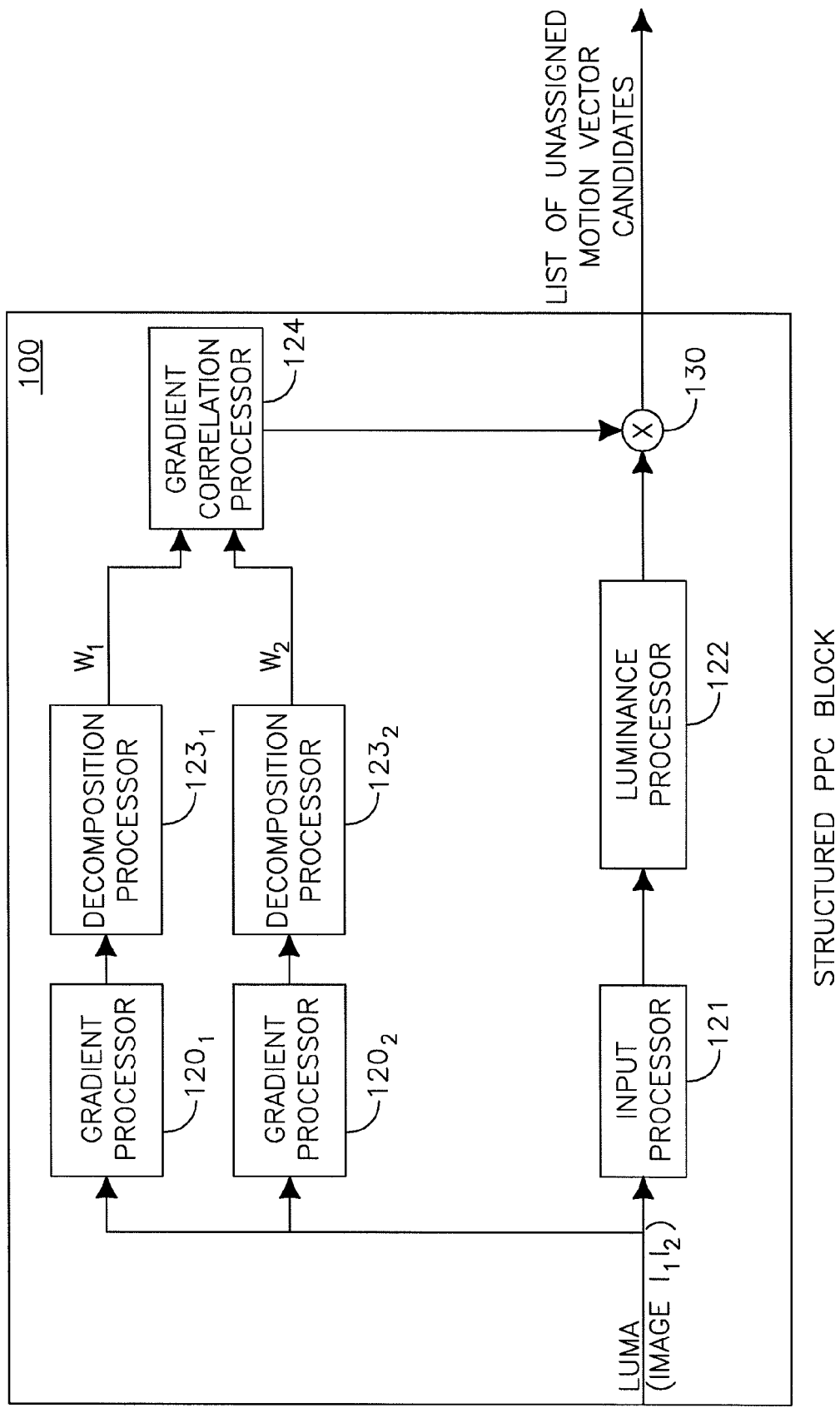
FIG. 3 is a block diagram of an apparatus employing the disclosed image correlation method.

FIG. 3 is a block diagram of an apparatus 100 employing the disclosed image correlation method. Referring to FIG. 3, apparatus 100 comprises an input processor 121, a plurality of gradient processors $120_1$, $120_2$, a luminance processor 122, a plurality of decomposition processors $123_1$, $123_2$, a gradient correlation processor 124, and a combiner 130. It is preferable that the luminance and the gradient correlation processors 122, 124, respectively use PPC correlation. As will be appreciated, the functions performed by processors 122 and 124 are similar and, thus, alternative methods may use (and re-use) processor 122 with different inputs—images $I_1$ and $I_2$ (described below) in one operation and gradient fields ($w_1$, $w_2$—also described below) in a second operation.

Two images $I_1$ and $I_2$ are received at apparatus 100 and forwarded to input processor 121, and also forwarded to gradient processors $120_1$ and $120_2$, respectively. Input processor 121, coupled to luminance processor 122, processes the received images $I_1$, $I_2$, for correlation, which may include smoothing or filtering the two images, for example.

The process of generating the structured PPC surface includes combining a luminance-based correlation and a gradient-based correlation. The luminance-based correlation, preferably luminance-based PPC correlation, is a cross-correlation between images that is normalized with respect to offsets in brightness. The process of correlation is one where the two images slide over one another and the overlapping portions of the images are summed. The sum is a measure of similarity between the two images at particular shifts in the x and y directions.

Referring to FIG. 3, luminance processor 122 receives the processed image signals $I_1$ and $I_2$. Luminance processor 122 conducts a real correlation analysis of images using a luminance-based PPC correlation, where alpha=1. The luminance-based PPC correlation is determined using the following:

$$PPC(I_1, I_2) = F^{-1}\left(\frac{F(I_1) \times F(I_2)^*}{|F(I_1) \times F(I_2)^*|}\right);\quad\text{Equation (1)}$$

where $F(I_1)$ and $F(I_2)$ are the Fourier transforms of the images $I_1$ and $I_2$ respectively; $F(I_2)^*$ is the complex conjugate of $F(I_2)$. It should be noted that this quantity is based on luminance similarity only. Although the disclosed method is described herein using the frequency domain, correlation may be done in the time domain. In the frequency domain, though, it is more efficient and the correlation can be normalized with respect to luminance.

Once luminance processor 122 has completed its correlation analysis, the resulting points PPC $(I_1, I_2)$ are forwarded to combiner 130, preferably a multiplier, for combining with a gradient-based PPC correlation, to be described below.

As indicated, the received images $I_1$, $I_2$ are forwarded to gradient processors 120 respectively, ($I_1$ to gradient processor 120$_1$ and $I_2$ to gradient processor 120$_2$). Gradient processors 120$_1$, 120$_2$ estimate local structure dimensionality, for example using Gradient Square Tensor (GST). The values generated by gradient processors 120$_1$ and 120$_2$ are then forwarded to decomposition processors 123$_1$ and 123$_2$, respectively. Although images $I_1$ and $I_2$ are shown as being forwarded to gradient processor 120$_1$, 120$_2$ prior to input processor 121, the images used by gradient processors 120$_1$, 120$_2$ may first be processed by input processor 121, as disclosed above, and then forwarded to gradient processor 120$_1$, 120$_2$. Also, gradient processor 120$_1$, 120$_2$ may be a single processor that makes local structure dimensionality of both images $I_1$, $I_2$ and forwards each separately to decomposition processors 123$_1$, 123$_2$.

Decomposition processors 123$_1$ and 123$_2$, coupled to gradient processors 120$_1$ and 120$_2$, respectively, and gradient correlation processor 124, then derive a complex gradient field for each image $I_1$ and $I_2$ received from gradient processors 120. The complex gradient field is derived by defining an array of complex phasors from a gradient decomposition by forming:

$$w = u + j \cdot v;\quad\text{Equation (2)}$$

where $j = \sqrt{-1}$ and $u(x,y)$ and $v(x,y)$ are the x and y components of the gradient direction. The more accurately the decomposition reflects the structures in the image, the better structural cross-talk during correlation will be attenuated. As such, it is preferable, but not required, for decomposition processors 123$_1$, 123$_2$ to use anisotropic decomposition with an energy diffusion term.

Anisotropic decomposition allows larger structures defined by their boundaries to maintain their structural orientation well away from their edges. As those having skill in the art would recognize, without energy diffusion, the estimate of direction, (i.e., u+jv), is limited to the breadth of the kernel used to perform the gradient decomposition. By adding a diffusion term to the gradient field, what is tantamount to a regularization step that captures image structure more generally is performed. Without diffusion, flat areas into which the entire gradient analysis kernel fits will result in a non-direction (no structure). That is, u and v will be approximately zero. In this case, the structured PPC surface will simply degenerate to the luminance PPC for flat areas with similar gradients. Although anisotropic decomposition with an energy diffusion term is preferable, any gradient decomposition, or any other structural decomposition, which doesn't propagate the gradient field into flat areas may be used.

Once decomposition processors 123$_1$, 123$_2$ derive the gradient field for each image $w_1$, $w_2$, a correlation analysis is conducted by gradient correlation processor 124. In accordance with the disclosed image correlation method, gradient correlation processor 124 conducts a gradient-based PPC analysis on each derived gradient field $w_1$, $w_2$.

Gradient correlation processor 124, coupled to decomposition processors 123$_1$ and 123$_2$ and combiner 130, receives the gradient fields $w_1$, $w_2$ from decomposition processors 123$_1$ and 123$_2$, respectively. Using gradient fields $w_1$ and $w_2$, gradient correlation processor 124 conducts a gradient-based correlation analysis, preferably gradient-based PPC correlation.

The gradient-based PPC (image structure based PPC correlation), which is a measure of the correlation in the structure of the image content, is computed using the following:

$$PPC(w_1, w_2) = F^{-1}\left(\frac{F(w_1) \times F(w_2)^*}{|F(w_1) \times F(w_2)^*|}\right),\quad\text{Equation (3)}$$

where, again, $w_1$ and $w_2$ represent the complex gradient fields for images $I_1$ and $I_2$, respectively, and $F(w_1)$ and $F(w_2)$ are the respective Fourier transforms. Gradient correlation processor 124, therefore, determines the gradient-based correlation between the received images $I_1$ and $I_2$ and forwards the values PPC $(w_1, w_2)$ to multiplier 130.

Combiner 130, coupled to gradient correlation processor 124 and luminance processor 122, receives the luminance-based correlation values PPC $(I_1, I_2)$ from processor 122 and the gradient-based correlation values PPC $(w_1, w_2)$ from processor 124. Combiner 130 then combines the luminance-based PPC and the gradient-based PPC into one surface, producing a list of unassigned motion vector candidates. The luminance-based PPC and gradient-based PPC are combined in accordance with the following:

$$SPPC = PPC(I_1, I_2) \times PPC(w_1, w_2).\quad\text{Equation (4)}$$

In this way, structures that are unrelated in each image will contribute far less to the overall candidate list than otherwise. As those having skill in the art know, the resulting candidate motion vectors may then be validated and used for further image processing, such as format conversion, de-interlacing, and any others where any sort of temporal interpolation is necessary. Although it is preferable that combiner 130 multiplies the surfaces to generate the structure PPC, any type of combiner may be used. For example, a weighting matrix may be applied to the image (signal) being correlated.

Figure 4:
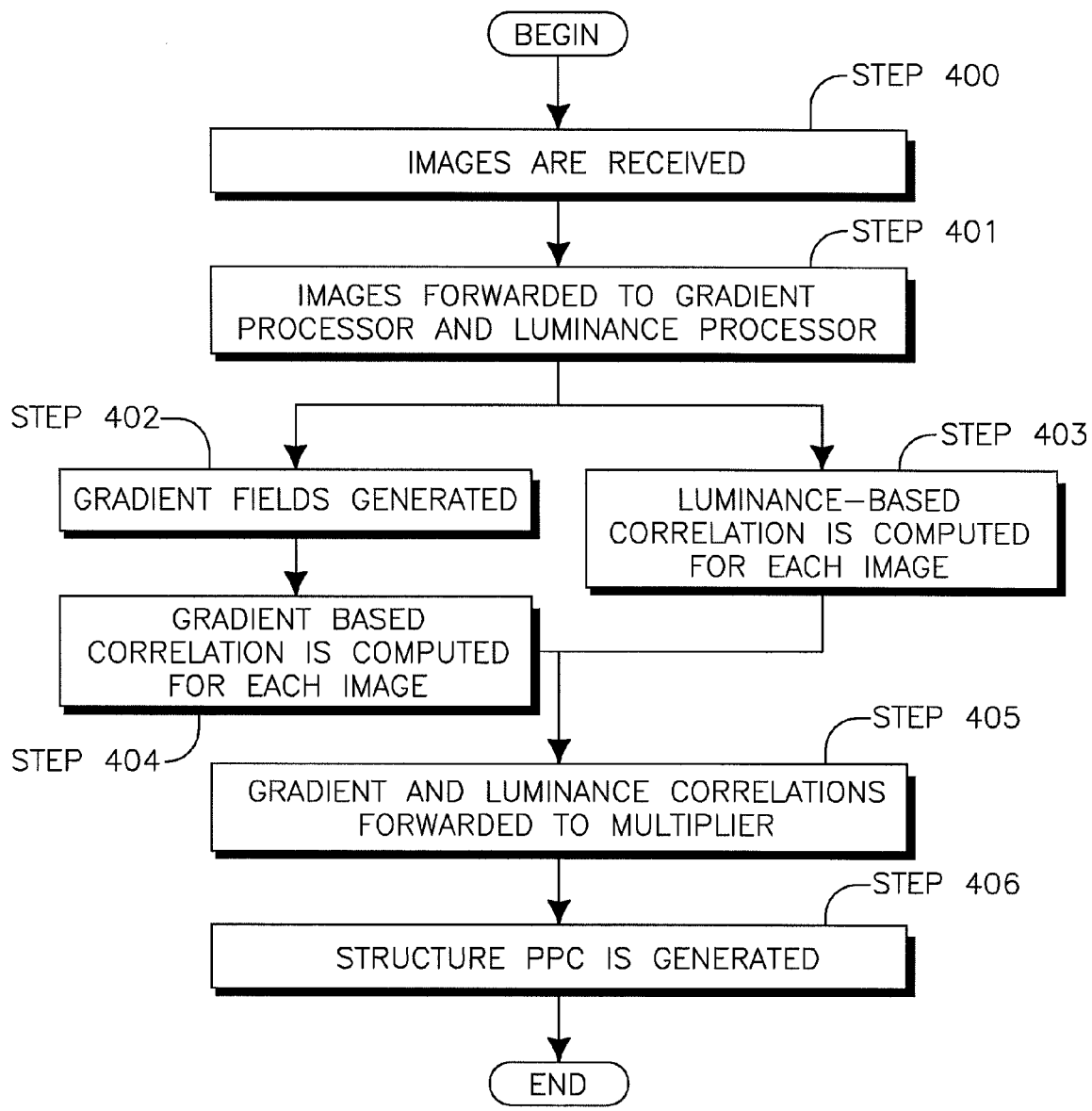
FIG. 4 is a flow diagram of the disclosed image correlation method.

A flow diagram of the disclosed method of correlation is illustrated in FIG. 4. As indicated hereinbefore, two images $I_1$, $I_2$ are received by apparatus 100 for image processing and correlation, (step 400). Both images $I_1$, $I_2$ are forwarded to gradient processors 120$_1$, 120$_2$ and decomposition processors 123$_1$, 123$_2$, for determining the local structure dimensionality and a gradient field $w_1$, $w_2$ for each image $I_1$, $I_2$, and luminance processor 122, for luminance-based correlation, (step 401). A gradient field $w_1$, $w_2$ for each image $I_1$, $I_2$ is generated by gradient processors 120$_1$, 120$_2$ and decomposition processors 123$_1$, 123$_2$, (step 402). Luminance-based PPC correlation is conducted for each image, (step 403). Gradient-based PPC correlation is conducted on each of the gradient fields $w_1$, $w_2$ for the images $I_1$, $I_2$ (step 404). The luminance-based correlation structure and gradient-based correlation structure are forwarded to combiner 130, (step 405) for combining. Combiner 130 then combines the luminance-based PPC correlation and gradient-based PPC, (step 406), thereby generating a structure that considers the luminance and the structure of each image $I_1$, $I_2$. Although the luminance-based PPC correlation has been disclosed as being conducted after the gradient field is generated and before gradient-based PPC correlation, luminance-based correlation may be done in parallel, before or after gradient processing of the images $I_1$, $I_2$.

Figure 5:
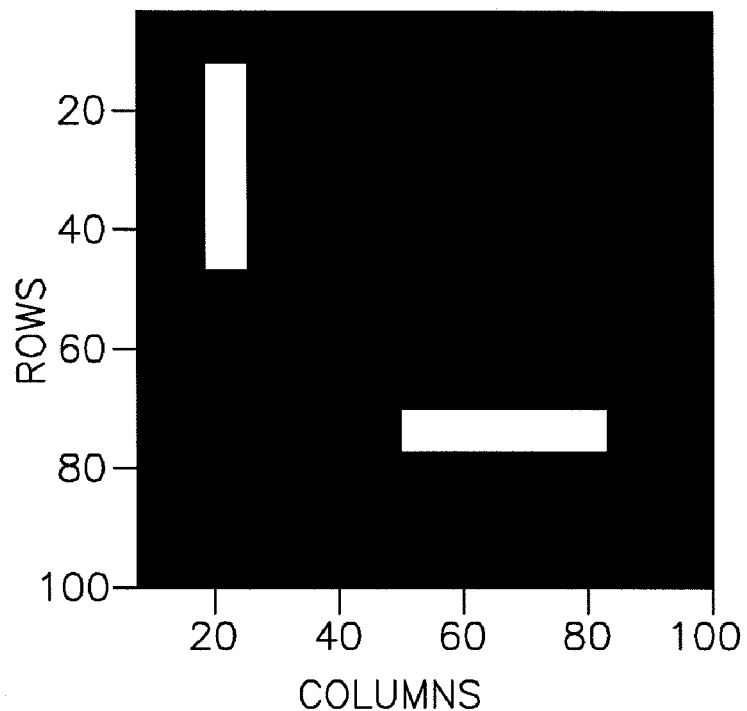
FIG. 5 is an illustration of a sequence of two images showing object motion.
Figure 5:
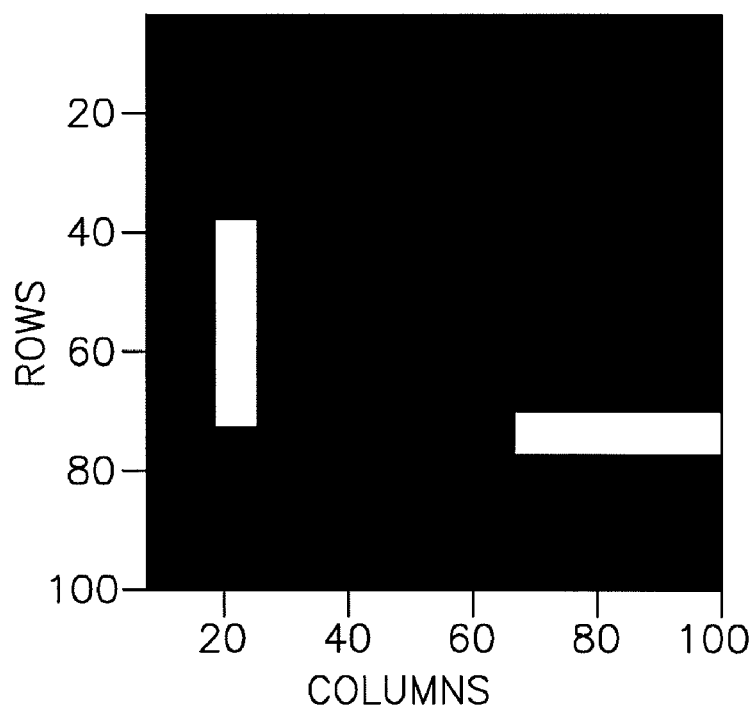

An example of the present method is demonstrated in FIG. 5. Referring to FIG. 5, a sequence of two images (image 1 and image 2), each of which contains two objects with identical luminance, is shown. In accordance with this example, one object moves to the right by 20 pixels and another moves down by 30 pixels. Using the standard PPC surface (alpha=1) for these images results in a surface as shown in FIG. 6.

Figure 6:
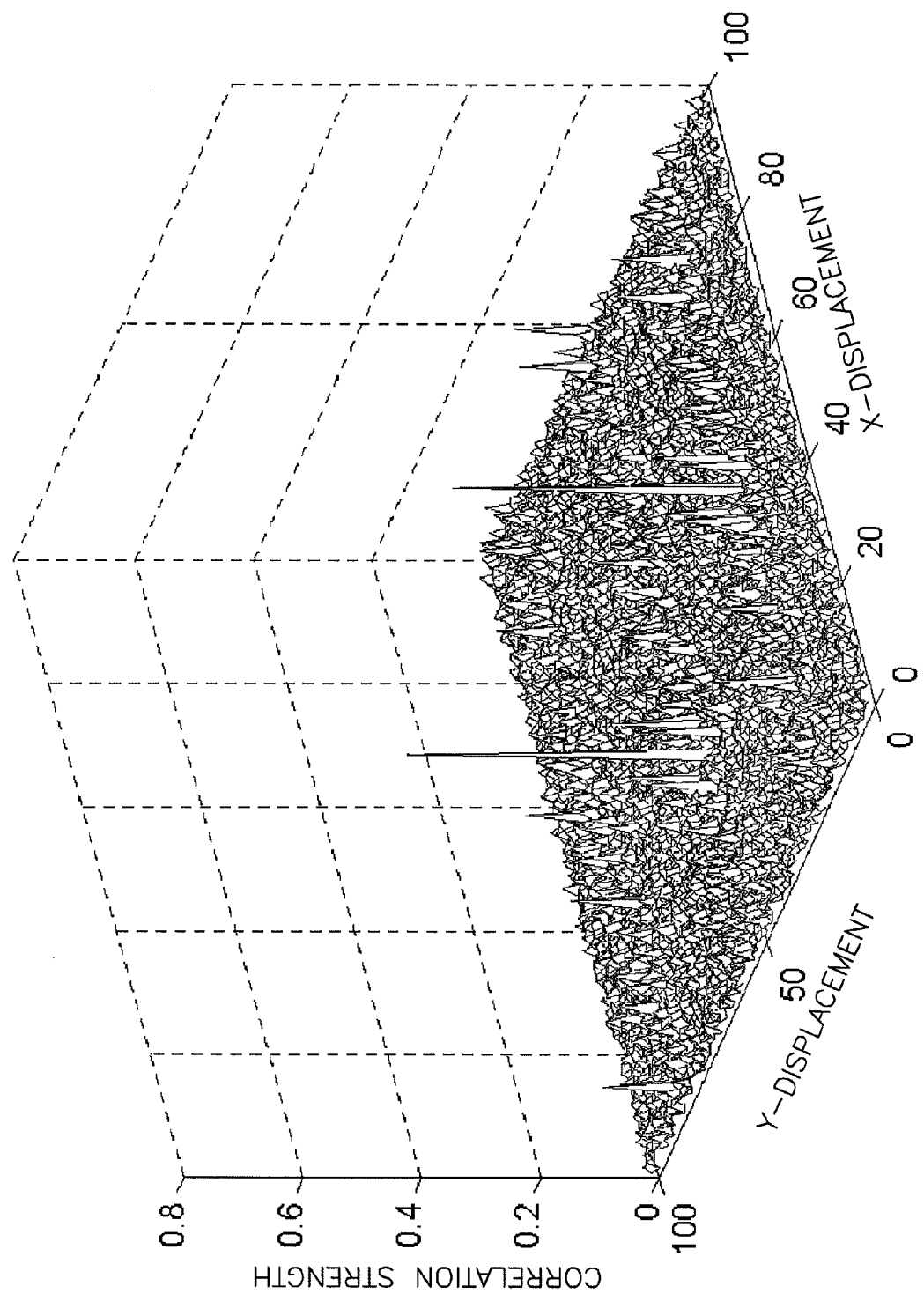
FIG. 6 is a PPC surface luminance only.

It should be noted in FIG. 6 that the surface is quite noisy and contains many spurious peaks. The largest 10 peaks (in amplitude) are shown in Table 1.

TABLE 1

Largest 10 peaks for PPC (alpha = 1)

| Peak Magnitude | Y-position | X-position |
|---|---|---|
| 0.5139 | 0 | 20.0000 |
| 0.4923 | 30.0000 | 0 |
| 0.1613 | 0 | 15.0000 |
| 0.1460 | 30.0000 | 31.0000 |
| 0.1433 | 30.0000 | 5.0000 |
| 0.1427 | 35.0000 | 0 |
| 0.1418 | 30.0000 | −5.0000 |
| 0.1401 | 34.0000 | −34.0000 |
| 0.1391 | 5.0000 | 20.0000 |
| 0.1295 | 30.0000 | −31.0000 |

Figure 7:
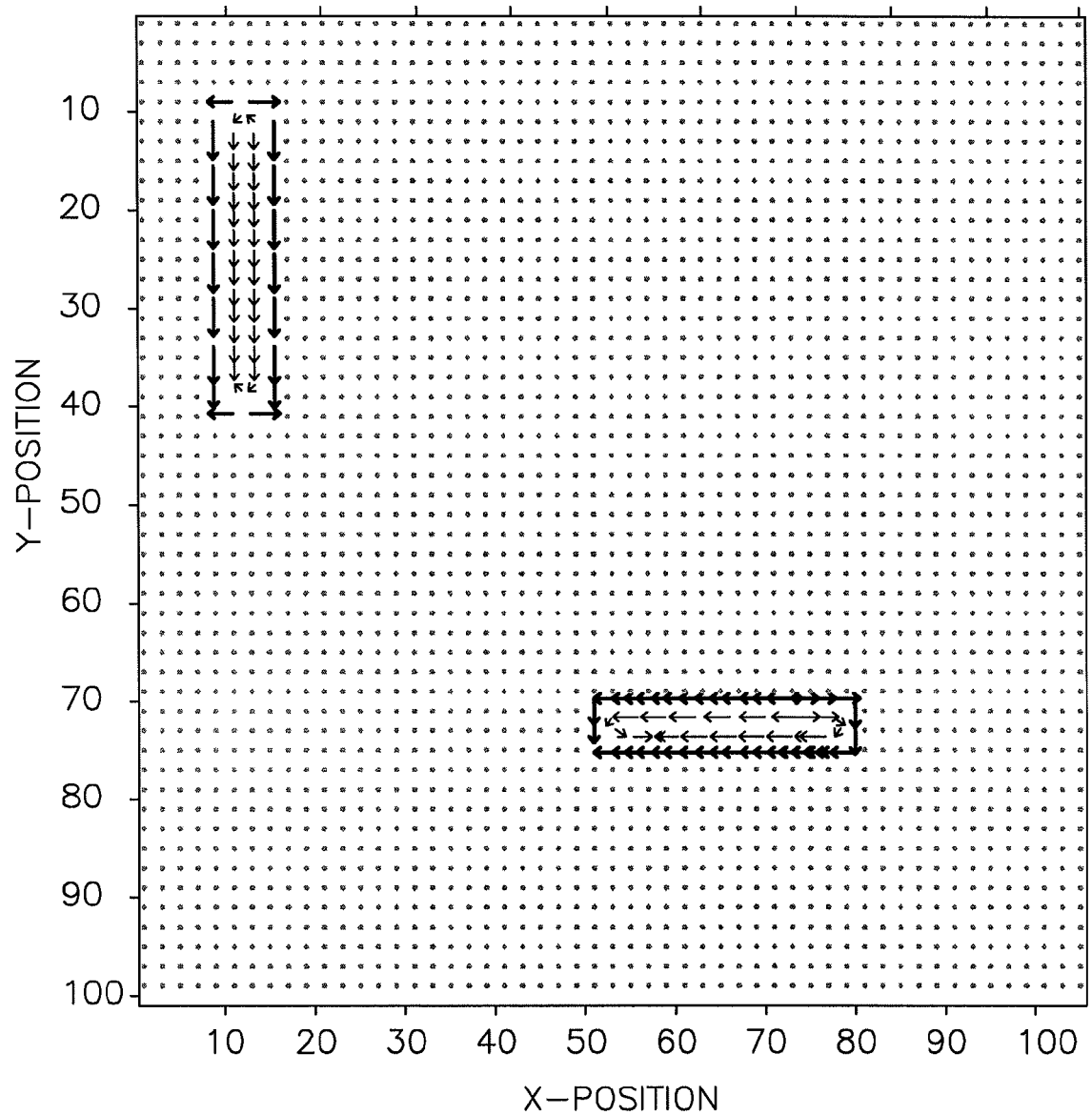
FIG. 7 is an example anisotropic decomposition of images 1 and 2.

As shown in Table 1, the ratio of peak heights (correlation energy) between the first two peaks to the total peak energy for the first ten peaks is 46.8%. That is, the non-spurious peak energy is larger than the true displacement. FIG. 7 illustrates the anisotropic decomposition for images 1 and 2.

Figure 8:
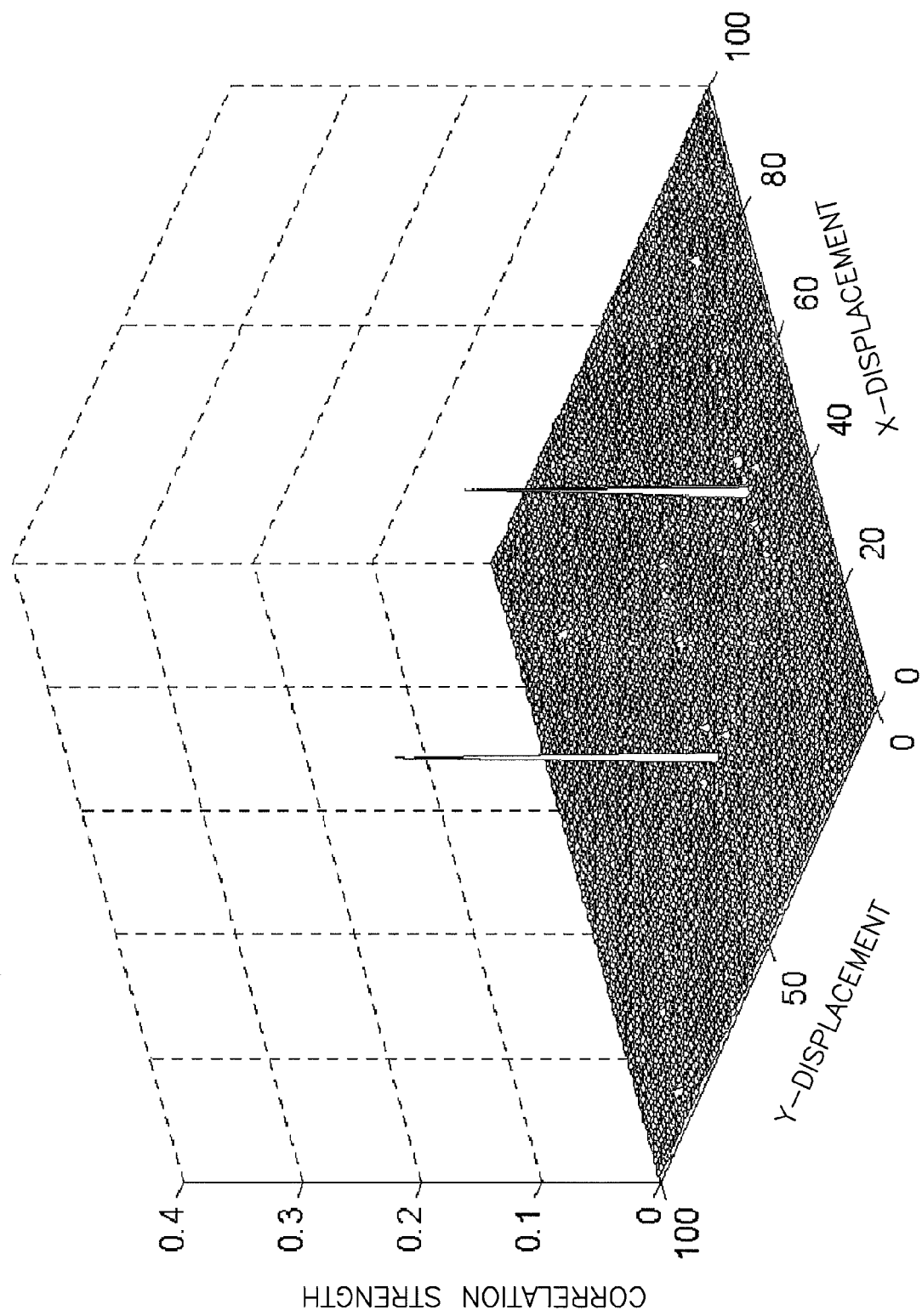
FIG. 8 is a structured PPC surface.

When both the structure and luminance are combined as disclosed above, the correlation surface shown in FIG. 8 is obtained.

The peak surface in FIG. 8 contains only two peaks and no spurious peaks of significance. The two peaks are therefore, the likely true peaks of interest. The corresponding largest ten peaks (in magnitude) are shown in Table 2.

TABLE 2

Largest 10 peaks for Structured PPC.

| Peak Magnitude | y-position | x-position |
|---|---|---|
| 0.2681 | 0 | 20.0000 |
| 0.2363 | 30.0000 | 0 |
| 0.0103 | −36.0000 | 46.0000 |
| 0.0093 | 34.0000 | −34.0000 |
| 0.0085 | 30.0000 | −5.0000 |
| 0.0082 | 0 | 15.0000 |
| 0.0074 | 35.0000 | 0 |
| 0.0072 | 5.0000 | 20.0000 |
| 0.0059 | 30.0000 | 5.0000 |
| 0.0053 | −5.0000 | 20.0000 |

As shown in Table 2, the ratio of peak heights (correlation energy) for the first two peaks to the total peak energy for the first ten peaks is now almost 90%. That is, the non-spurious peak energy constitutes only 10% of the total peak energy. This represents a five-fold decrease in energy in the spurious peaks.

Figure 9:
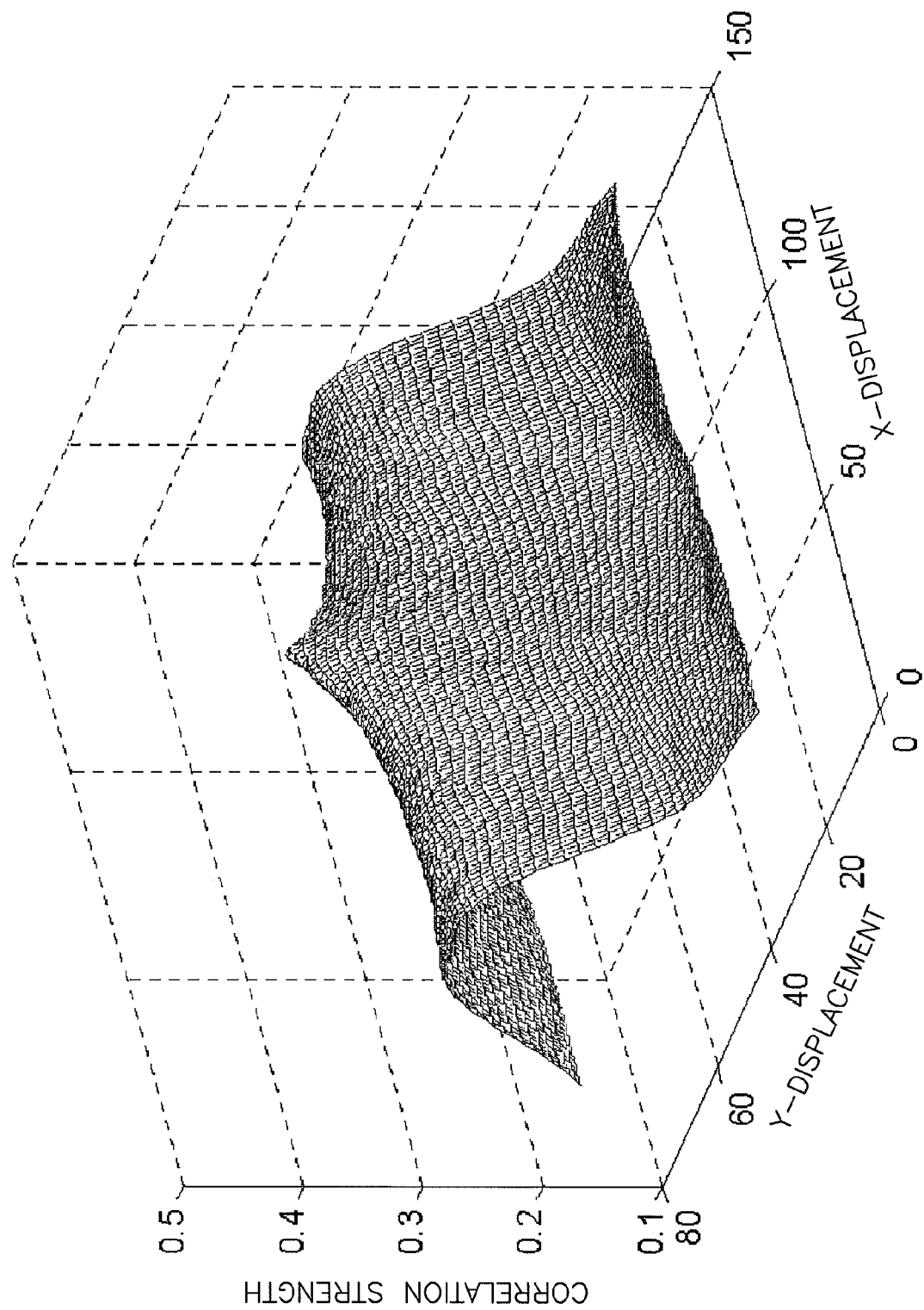
FIG. 9 is an example the PPC surface using luminance only.

Using the image of FIG. 2, FIG. 9 illustrates the correlation of the surface using luminance only. As clearly shown in FIG. 9, the peak is not significantly differentiated. The energy is widely distributed because the luminance only correlation cares only about similar luminance and not about image structure.

Figure 10:
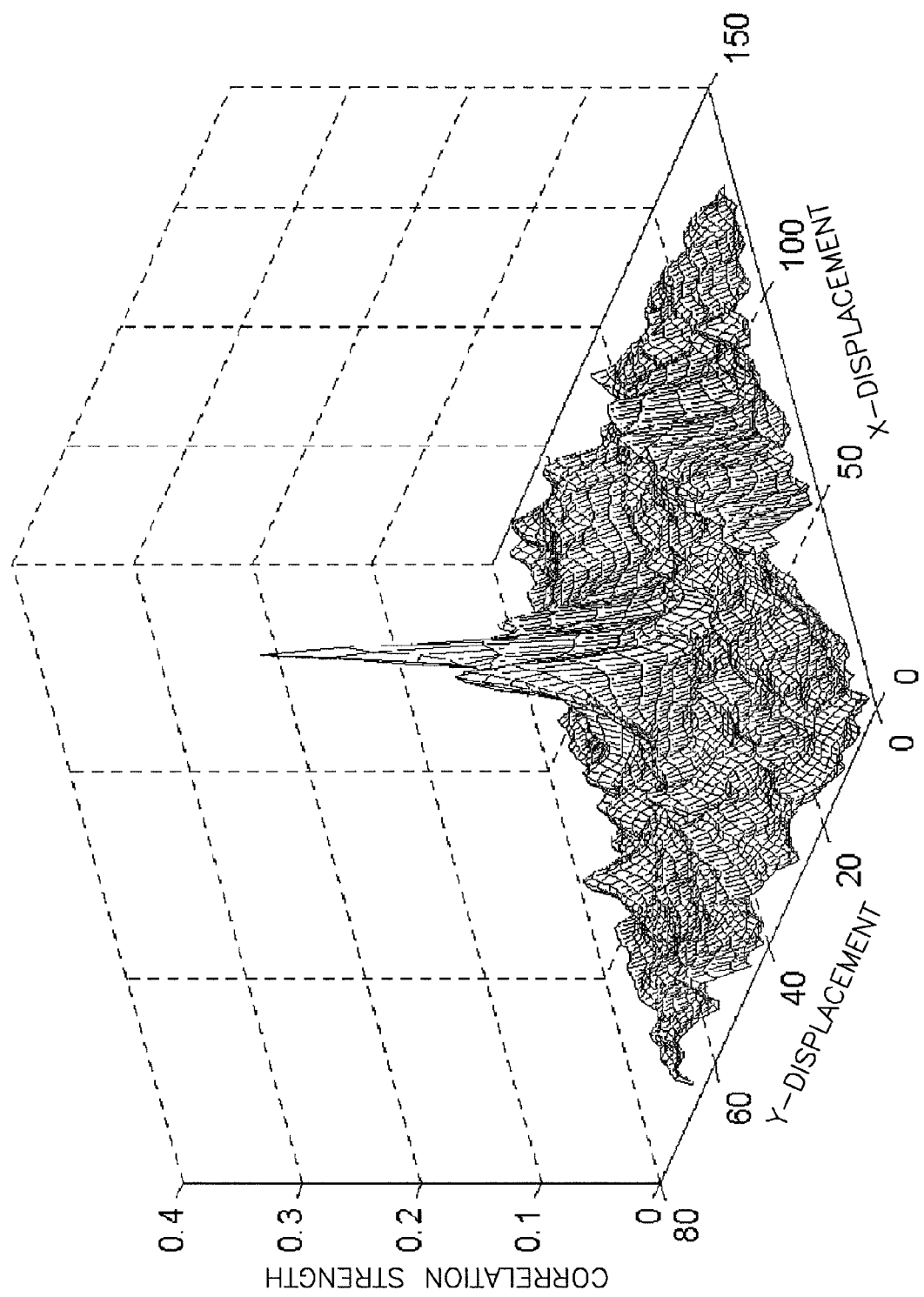
FIG. 10 is a structural PPC surface taking into account the disclosed method.

However, when the structural PPC surface is computed and taken into account along with the luminance correlation, as shown in FIG. 10, a much more differentiated (sharper) peak is obtained with far less energy distributed throughout the entire surface. As shown, using both structural and luminance correlations results in an immediate marked reduction in the energy away from the true match. Thereby generating a more accurate correlation between two images.

The disclosed method computes an image similarity based on the PPC technique that takes into account image structure. In so doing, PPC based on combining luminance and a textural decomposition of the image mitigates the affect of spurious peak energy; an undesirable consequence of the PPC technique.

Although this method is disclosed using a two-dimensional image, it should be noted that this method may be employed in a non-dimension or three dimension images as well. A series of images can be used, which when arranged side-by-side cause objects in the image sequence to form volumes. These volumes also have a structure in three dimensions and the disclosed structured PPC method can be used. In general, due to the separability of the Fast Fourier Transform (FFT), the disclosed structured PPC method can be performed in an arbitrary number of dimensions. If cause relationships between multi-dimensional quantities, such as is the case in data mining, are being investigated, (on to name but one example where data is multi-dimensional), the disclosed correlation method may be applicable.

Although the features and elements are described in particular combinations, each feature or element can be used alone without the other features and elements or in various combinations with or without other features and elements. The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

What is claimed is:

1. A method for correlating two images comprising:
   using a processor to perform a luminance-based correlation analysis on each image, wherein the luminance-based correlation uses luminance-based phase plane correlation (PPC) and is computed using the equation:

$$PPC(I_1, I_2) = F^{-1}\left(\frac{F(I_1) \times F(I_2)*}{|F(I_1) \times F(I_2)*|}\right),$$

where $I_1$ and $I_2$ are the respective images, F is a Fourier Transform, and $F(I_2)^*$ is a complex conjugate of $F(I_2)$;

using a processor to perform a gradient-based correlation analysis on each image, wherein the gradient-based correlation uses gradient-based PPC and is computed by the equation:

$$PPC(w_1, w_2) = F^{-1}\left(\frac{F(w_1) \times F(w_2)^*}{|F(w_1) \times F(w_2)^*|}\right),$$

where $w_1$ and $w_2$ represent the gradient field from each image and $F(w_2)^*$ is a complex conjugate of $F(w_2)$; and using a processor to combine the luminance-based correlation and the gradient-based correlation to generate a structure correlation, wherein the structural correlation is determined using the equation:

SPPC=PPC($I_1,I_2$)×PPC($w_1,w_2$).

2. The method of claim 1, wherein the gradient-based correlation analysis further includes:
   estimating a local structure of each image; and
   generating a gradient field for each image using the respective estimations.

3. The method of claim 2, wherein the estimation uses Gradient Square Tensor.

4. The method of claim 2, wherein the gradient field is generated using gradient decomposition.

5. The method of claim 4, wherein the gradient decomposition is anisotropic decomposition with an energy diffusion term.

6. The method of claim 1, wherein the structure correlation comprises candidate motion vectors for use in image processing, including format conversion.

7. An apparatus for correlating two images, comprising:
   a luminance correlation processor for performing a luminance-based correlation analysis on each image, wherein the luminance-based correlation uses luminance-based phase plane correlation (PPC) and is computed using the equation:

$$PPC(I_1, I_2) = F^{-1}\left(\frac{F(I_1) \times F(I_2)^*}{|F(I_1) \times F(I_2)^*|}\right),$$

where $I_1$ and $I_2$ are the respective images, F is a Fourier Transform, and $F(I_2)^*$ is a complex conjugate of $F(I_2)$;

a gradient correlation processor for performing a gradient-based correlation analysis on each image, wherein the gradient-based correlation uses gradient-based PPC and is computed by the equation:

$$PPC(w_1, w_2) = F^{-1}\left(\frac{F(w_1) \times F(w_2)^*}{|F(w_1) \times F(w_2)^*|}\right),$$

where $w_1$ and $w_2$ represent the gradient field from each image and $F(w_2)^*$ is a complex conjugate of $F(w_2)$; and a combiner for combining the luminance-based correlation and the gradient-based correlation, thereby generating a structure correlation, wherein the structural correlation is determined using the equation:

SPPC=PPC($I_1,I_2$)×PPC($w_1,w_2$).

8. The apparatus of claim 7, wherein the gradient correlation processor further comprises:
   a gradient processor for estimating a local structure of each image; and
   a gradient field processor, coupled to said gradient processor and said gradient correlation processor, for generating a gradient field for each image using the respective estimations.

9. The apparatus of claim 8, wherein said gradient processor uses Gradient Square Tensor.

10. The apparatus of claim 8, wherein the gradient field is generated using gradient decomposition.

11. The apparatus of claim 10, wherein the gradient decomposition is anisotropic decomposition with an energy diffusion term.

12. The apparatus of claim 7, wherein said luminance correlation processor and said gradient correlation processor are included in a single processor.

13. A non-transitory computer-readable storage medium storing a set of instructions for execution by one or more processors to facilitate manufacture of a processor, the processor comprising:
   a luminance correlation processor for performing a luminance-based correlation analysis on each image, wherein the luminance-based correlation uses luminance-based phase plane correlation (PPC) and is computed using the equation:

$$PPC(I_1, I_2) = F^{-1}\left(\frac{F(I_1) \times F(I_2)^*}{|F(I_1) \times F(I_2)^*|}\right),$$

where $I_1$ and $I_2$ are the respective images, F is a Fourier Transform, and $F(I_2)^*$ is a complex conjugate of $F(I_2)$;

a gradient correlation processor for performing a gradient-based correlation analysis on each image, wherein the gradient-based correlation uses gradient-based PPC and is computed by the equation:

$$PPC(w_1, w_2) = F^{-1}\left(\frac{F(w_1) \times F(w_2)*}{|F(w_1) \times F(w_2)*|}\right),$$

where $w_1$ and $w_2$ represent the gradient field from each image and $F(w_2)^*$ is a complex conjugate of $F(w_2)$; and a combiner for combining the luminance-based correlation and the gradient-based correlation, thereby generating a structure correlation, wherein the structural correlation is determined using the equation:

SPPC=PPC($I_1,I_2$)×PPC($w_1,w_2$).

14. The non-transitory computer-readable storage medium of claim 13, wherein the instructions are hardware description language (HDL) instructions used for the manufacture of a device.

* * * * *